United States Patent [19]

Goel

[11] Patent Number: 4,743,672

[45] Date of Patent: May 10, 1988

[54] SAG RESISTANT, TWO COMPONENT URETHANE ADHESIVES

[75] Inventor: Anil B. Goel, Worthington, Ohio

[73] Assignee: Ashland Oil, Inc., Ashland, Ky.

[21] Appl. No.: 19,167

[22] Filed: Feb. 26, 1987

[51] Int. Cl.$^4$ .............................................. C08G 18/32
[52] U.S. Cl. ....................................... 528/44; 528/54; 528/55; 528/58; 528/60; 528/61; 528/66; 528/905
[58] Field of Search ....................... 528/44, 54, 55, 58, 528/60, 61, 66, 905

[56] References Cited

U.S. PATENT DOCUMENTS 3,714,127  1/1973  Fabris et al. ............................ 528/44
4,444,976  4/1984  Rabito ..................................... 528/61

Primary Examiner—Maurice J. Welsh
Assistant Examiner—S. A. Acquah
Attorney, Agent, or Firm—John F. Jones

[57] ABSTRACT

A sag resistant two component polyurethane adhesive comprising a first polyisocyanate component and a second component comprising a polyol, a poly(alkylene oxide) polyamine and a polyurethane catalyst is described.

9 Claims, No Drawings

SAG RESISTANT, TWO COMPONENT URETHANE ADHESIVES

This invention relates to an improved two component polyurethane adhesive comprising a polyisocyanate or a polyisocyanate prepolymer as the first component and a second curative component comprising a mixture of polyols, a poly(alkylene oxide) polyamine, a polyurethane catalyst and optionally a bicyclic amide acetal and to a method for its preparation and use.

The improved polyurethane adhesives which result from mixtures of the two components of this invention have been found to have excellent sag resistance and exhibit excellent tack and peel strength during the open time (working time) of the adhesive and after gelation both at ambient temperatures and at elevated temperatures which develop structural adhesive strength in the adhesive.

Two component urethane adhesives are well known (U.S. Pat. Nos. 3,714,127; 3,812,003; 3,877,122; 3,935,051 and 4,444,976, for instance) and are widely used to adhere substrates such as plastic adherends together. The choice of urethane adhesives over other adhesives is based in part upon their outstanding characteristics with respect to bond strengths, flexibility, shock and impact resistance, fatigue resistance, and the like. Generally the polyurethane adhesives have certain open time (processing time after mixing the two components) during which time the mixed adhesive materials are soft, workable and in an ungelled state. Thus, substrates can be assembled (put together) and depending upon the types and amounts of catalysts, the adhesive turns into a gelled state after a certain time at room temperature. At this point the parts cannot be assembled (i.e., beyond the open time or pot life of the adhesive). The prior art polyurethane adhesives based on the polyol/polyisocyanate copolymers during the open time (processing or bonding time) are too soft or without sufficient cohesive strength to hold the substrates together and they exhibit poor adhesion performance (peel strength and shear strength) and generate enough green strength (handling strength) only after the gelation (infusible state of adhesive) occurs.

I have discovered improved polyurethane adhesives based on the terpolymerization of polyol/poly(alkylene oxide) polyamine/polyisocyanate which have excellent green strength (peel and shear strength before curing) during the open time processing time) of the adhesive (adhesive has pressure-sensitive adhesive properties or semi-structural adhesive properties during the application or processing time) and developing the full strength at room temperature or low temperature curing. Such improved polyurethane adhesives are useful in assembling flexible, semi-structural and structural parts from substrates such as reinforced and unreinforced thermoplastic or thermosetting resins, metal, ceramic structures, and the like with relatively long processing time freedom.

Two component polyurethane adhesives are commonly used to adhere structural substrates such as reinforced plastics, metals, wood and glass and have been used commercially for more than two decades. Generally speaking conventional polyurethane adhesives are either gravity flowable or highly viscous two component systems wherein one component is composed of an isocyanate prepolymer and the second component contains an admixture of a polyhydroxy compound free of isocyanate groups and selected urethane catalysts. In addition to this, the polyhydroxy component, generally known as the curative component, sometimes contains a small amount of low molecular weight (generally less than 400 molecular weight) di- or poly-primary or secondary amine for the purpose of sag resistant property buildup. Thus, the polyurethane adhesive formed by blending the above two components in appropriate mix ratios provides the sag resistant, soft adhesive mixture having non-to-poor initial tack and peel strength, which upon heating or standing for a long time at room temperature build the adhesion by curing of polyols with the polyisocyanate. Thus, the conventional urethane adhesives described in the prior art do not possess enough green strength to hold the semi-structural and structural parts together during the adhesive open time (working or bonding or assembling or processing time) and require clamping (fastening) temporarily prior to the heat curing of the adhesive. Furthermore, once the adhesives reach the partial gelation stage, these adhesives are not soft or fusible enough to use them for bonding the parts. In other words, the conventional adhesives generally exhibit two physical stages, i.e., initially the open time stage where the adhesives are soft, creamy (non-gelled form) with no or poor adhesion strength followed by the second infusible gelled stage (without the mobility of the adhesive) having good peel, shear and adhesion strengths. The in-between stage in which the adhesive remains ungelled and easily processible (bondable) but still provides enough green strength to hold the structural parts together, and also enough strength to break the semi-structural parts upon attempting to peel apart the adhered substrates, generally is either non-existant or is very short lived in the case of polyurethane adhesives described in the prior art. There is a need to a flexible structural adhesive having a long open time with good green strength property which can provide long processing time freedom requiring no pressure clamping of adherends together and which, upon curing either at room temperature or heat curing, exhibit excellent structural adhesive property with high flexibility, impact and shear resistance, etc.

It is an object of this invention to provide a two component polyurethane adhesive having the following combination of physical and performance properties:

Individual components with low enough viscosities so that these can be mixed rapidly by using impingement mixing, molecular mixing or meter mixing devices. The mixed adhesive can be applied or spread on the substrates in a thin film as well as a thick film, with the thickness preferably varying from about 0.1 to about 30 mils.

Sag resistant property in the mixed adhesive to avoid dripping or sagging of the adhesive when applied to vertical substrate surfaces.

Long open time with enough green strength in the uncured adhesive to hold the parts together without peeling off itself, thus requiring none to little clamping of the parts prior to curing of the adhesive. In other words, an adhesive developing pressure-sensitive adhesive type tack and peel strength similar to that developed by neoprene or butyl rubber cements.

Room temperature curable adhesive with an option of fast curing at low to moderately elevated temperatures.

Highly flexible adhesive in ungelled, partially gelled and fully cured stages which can be used for bonding of flexible non- or semi-structural substrates as well as structural substrates.

Antifoaming property and non-friable adhesive if foamed.

Excellent adhesion performance towards a variety of flexible, semi-structural and structural substrates including polyester fabric, polyester foam, polystyrene foam, nylon, urethane elastomers and thermosets, urethane foams, aluminum, plywood, glass and ceramics, fiber reinforced polyester plastics such as sheet molding compounds (SMC), fiber reinforced thermoplastic polymers and the like.

It has now been found that the polyurethane adhesives obtained by mixing an isocyanate prepolymer with a curative component containing varying amounts (about 2 to 50% and preferably from about 5 to about 40% by weight of total curative) of a poly(alkylene oxide)polyamine (di, tri or poly primary amines of molecular weight ranging from above 400 up to about 10,000) admixed with polyhydroxy compounds exhibit the above described physical and performance features of the adhesives. The use of short chain di- or polyamines in the polyurethane adhesive compositions has been described in the prior art for the sake of developing the non-sag behavior of the ungelled adhesive. In fact, use of such short chain amines in the curative component does provide the sag resistance upon mixing with the isocyanate prepolymer. However, in these cases, the mixed adhesives generally do not possess the high tack and peel strength needed to hold the substrate together. Use of poly(alkylene oxide)polyamines of high molecular weights has been made in the prior art in the formation of injection molded elastomers by reaction with polyisocyanate as described in the representative U.S. Pat. Nos. 4,433,067; 4,448,904 and 4,474,901. In these cases, the reactions are so rapid that polymerization occurs within a few seconds to minutes and the products are non-tacky solids. On the other hand, use of such poly(alkylene oxide)polyamines in the instant invention mixed in appropriate amounts with polyhydroxy compounds, such as poly(alkylene oxide)polyols of molecular weights ranging from 400 to 10,000 results in the formation of products upon blending with polyisocyanates which remained ungelled for a much longer time and have high tack and peel strength. The use of long chain poly(alkylene oxide) diamines in the curative component permits use of lower molecular polyisocyanates without formation of the prior used isocyanate prepolymers. The curative component of this invention may also consist of low molecular weight (40 to 400 molecular weight) chain extender polyols in amounts ranging from 0 to 30% by weight of the total curative component and small amounts (0 to about 5% by weight) of low molecular weight di- or polyamines (aliphatic or aromatic, primary and secondary amines of molecular weight ranging from 60 to 400) for the purpose of sag resistant property of the adhesive if so desired. Such polyamines include ethylene diamine, propylene diamine piperazine, substituted piperazines, diethylene triamine, triethylene tetramine and the like.

In order to increase the cure speed, known urethane catalysts such as inorganic and organometallic carboxylate and halide salts of metals such as tin, bismuth, zinc, lead, mercury, vanadium, cobalt, nickel, iron, potassium, copper, etc. (for instance, dibutyltin dicarboxylate, stannous octoate, zinc octoate, bismuth octoate, etc.) and tertiary amines (blocked and free tertiary amines) such as N,N',N''-tris(dimethylaminopropyl)-hexahydrotriazine, tris(dimethylaminomethyl)phenol, triethylene diamine, imidazolines and the like may be used in the curative component. In order to avoid the problem of foaming when required, additives such as molecular sieves and bicyclic amide acetals of the formula

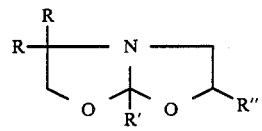

wherein R, R' and R'' independently represent hydrogen, an alkyl or alkyl ether group having from 1 to 20 carbon atoms or an alkaryl group having from 7 to 20 carbon atoms may be included in amounts ranging from 0 to 10% by weight based on the weight of the other ingredients of the curative component.

The polyhydroxy compounds useful in this invention are those having at least two hydroxyl groups per molecule and having equivalent weights falling in the range of from about 20 to 5000. Specific polyols include butane diol, cyclohexane dimethanol, tripropylene glycol, amide diols, urethane diols, polyether polyols such as poly(tetramethylene ether)diols, poly(propylene ether)polyols, polyester polyols and others.

Polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,3-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

When a bicyclic amide acetal is used in the curative component in accordance with this invention it behaves at least as a bifunctional molecule reactive towards isocyanate groups in both hydrolyzed and as unhydrolyzed form. The bicyclic amide acetal also helps to reduce the viscosity and the compatibility of the curative component. The curative component may be used either unfilled or filled with known fillers such as talc, kaolin, metal oxides, and aluminum oxide. The adhesive components (polyisocyanate or polyisocyanate prepolymer component and the curative component) can be mixed in various ways, for instance, by impingement mixing, molecular mixing, and static mixing under pressure and can be applied to the substrate in the form of a thin film by spraying on the substrate or in the form of a bead of desired thickness. The use of poly(alkylene oxide)polyamines of the specified high molecular weight in the curative component of the polyurethane adhesives of this invention provides several distinct advantages over the prior art urethane adhesives including (1) rapid viscosity buildup on mixing with isocyanate prepolymer, (2) rapid peel strength buildup in the non-gelled adhesive mixture, (3) reduction of isocyanate vapors during spraying applications, (4) reduction of foaming and formation of non-friable bubbles at much reduced level, (5) flexible adhesives with excellent adhesion performance, and (6) no need for a preformed isocyanate prepolymer.

The adhesives of this invention may be used for bonding of flexible, semi-structural and structural substrates in the form of cloth, thin sheets, thick objects, foams and the like used in applications such as carpeting, headliners for automobiles and other automobile interior applications, plywood, laminates, the assembling of counter tops, adhering foams to metals or plastics, glass and the like.

This invention is further illustrated in the following representative examples.

EXAMPLE 1

An isocyanate prepolymer was prepared by reacting 43.7 parts by weight of a 2000 molecular weight poly(propylene oxide) diol capped with ethylene oxide with 13.5 parts by weight of oligomeric methylene bis(phenyl isocyanate) (NCO functionaltiy of 2.7) followed by mixing with 23.7 parts by weight of liquid methylene bis(phenyl isocyanate) (NCO functionality of 2.1). The resulting liquid prepolymer was found to have 15.9% by weight of NCO groups (NCO equivalent weight of 264.3).

EXAMPLE 2

An isocyanate prepolymer was prepared by reacting 100 parts by weight of liquid methylene bis(phenyl isocyanate) (NCO functionality of 2.1) with 60 parts by weight of poly(propylene oxide)diol capped with ethylene oxide (molecular weight of about 1000). The resulting liquid prepolymer was found to contain 15.1% of NCO groups.

EXAMPLE 3

A curative component was prepared without the use of a poly(alkylene oxide)polyamine and is for comparative purposes and is otherwise outside the scope of this invention. The curative was prepared by reacting 78 parts by weight of poly(propylene oxide) triol capped with ethylene oxide (hydroxy equivalent weight of about 1167) with 2.95 parts by weight of toluene diisocyanate followed by mixing with 34.8 parts by weight of ethylene oxide capped poly(propylene oxide)tetraol (molecular weight of about 450). To the resulting solution was added 0.34 parts by weight of triethylene diamine catalyst and 1.6 parts by weight of piperazine. The viscosity of the resulting curative component was found to be about 2200 cps.

EXAMPLE 4

This example is for comparison purposes and is outside the scope of the present invention. The purpose of this example is to show that when the curative component of Example 3 was mixed with the prepolymer component of Example 1 the resulting adhesive does not show enough green strength to hold the semi-structural or structural parts together during the open time (working time) of the adhesive. The prepolymer component of Example 1 (10 g) was mixed rapidly with 10 g of the curative of Example 3 and the mixture was applied (1) on a Mylar film and (2) on a polystyrene foam sheet with uneven surface in film form with an approximate thickness of 1-5 mils of adhesive. The adhesive layer on the Mylar film was tested for peel strength and it was found that it had a peel strength of 0-2 pounds per inch of width during the initial 15 minutes following application and shortly after 15 minutes the film had become gelled indicating no green strength and short open time for the adhesive. The polystyrene foam sheet coated with the adhesive film was pressed with the adhesive side up in contact with the surface of a flexible polyester foam sheet and the sheets separated immediately when the pressure was released indicating insufficient green strength in the adhesive to keep the sheets adhered to one another prior to curing of the adhesive.

EXAMPLE 5

A curative component was prepared by reacting 47.5 parts by weight of poly(propylene oxide)triol capped with ethylene oxide (hydroxy equivalent weight of about 1167) with 1.3 parts by weight of toluene diisocyanate followed by mixing with 32 parts by weight of ethylene oxide capped poly(propylene oxide)tetraol (molecular weight of about 450), 12.7 parts by weight of poly(propylene oxide)diprimary amine (molecular weight of about 2000), 5.8 parts by weight of poly(propylene oxide)triprimary amine (molecular weight about 3100), 0.6 parts by weight of a bicyclic amide acetal of the foregoing formula in which R and R" are hydrogen and R' is a methyl group and 0.25 parts by weight of triethylene diamine. The hydroxy number of the component was found to be 168 and it was designated C1. A part of this material was mixed with 10.1% by weight of dibutyltin dilaurate catalyst and was designated C2.

EXAMPLE 6

The procedure of Example 5 was followed using 45.6 parts by weight of the triol of Example 5, 3 parts by weight of toluene diisocyanate, 33.8 parts by weight of the tetraol of Example 5, 9.2 parts by weight of the diamine of Example 5, 9.2 parts by weight of poly(propylene oxide)triamine (molecular weight of about 5000), 0.6 parts by weight of the bicyclic amide acetal and 0.25 parts by weight of triethylene diamine. This curative component was designated C3 and had a hydroxy number of 174.

EXAMPLE 7

The procedure of Example 5 was followed using 112 g of the triol, 78 g of the tetraol of Example 5, 3 g of toluene diisocyanate, 30 g of the diamine, 13.7 g of triamine and 0.51 g of triethylene diamine catalyst. This curative was designated C4 and had a hydroxy number of 164.

EXAMPLE 8

The C1 curative of Example 5 (11 g) was rapidly mixed with 10 g of the prepolymer of Example 1 and applied on Mylar film, and also on a polystyrene foam sheet in the form of a thin film with thickness ranging from 1-5 mils. The Mylar film was subjected to peel strength testing at various times against stainless steel and was found to have peel strengths of from 5-7 pounds per inch of width during the first 10-20 minutes. The polystyrene foam sheets were adhered with flexible polyester foam at various times ranging between 1-20 minutes, adhesion performance was higher than the strength of the polyester foam and the substrate failed. The adhesive film was found to be usable to adhere various substrates, including polyurethane foams, polyester foam or cloth, plywood, polyvinyl chloride flexible sheet aluminum sheet, cold rolled steel, and reinforced plastic during any time after mixing up to 20 minutes. The Mylar film adhered with stainless steel when tested for shear strength using a 1000 g weight produced no bond slippage during a seven day period of testing.

EXAMPLE 10

The procedure of Example 8 was followed using the curative (10 g) of Example 6 and prepolymer (10 g) of Example 2. The adhesive showed good green strength during the period of 5-30 minutes after mixing to hold the semi-structural parts, and showed enough strength after 10 minutes of mixing to provide substrate failure upon attempted peeling of adhered semi-structural substrates such as polyester and polystyrene foams and cloths, plywood and cardboard.

EXAMPLE 11

The procedure of Example 8 was followed using 10 g of the prepolymer of Example 2 and 10 g of the curative C4 of Example 7. The mixed adhesive applied on the Mylar films in the form of 3 mils thick film showed open time (working time) of about 50 minutes with enough green strength to hold the parts together between 5-50 minutes after mixing. The peel strength of the adhesive film was found to be between 5-7 pounds during this time. Also during this time, semi-structural substrates such as polyester, polyurethane or polystyrene foamed parts or thin sheets of cloth showed adhesion strength greater than the substrate's strength thus resulting in substrate failure during the attempted separation of the adhered substrates.

EXAMPLE 12

This example demonstrates that the use of poly(propylene oxide) diamine in the curative component helps avoid the need for isocyanate prepolymer formation in the resin component.

A solution of 14 parts by weight the triol of Example 5, 50 parts by weight of the tetraol of Example 5, 16 parts by weight of poly(propylene oxide) diamine (2000 molecular weight), 2 parts by weight of poly(propylene oxide) triamine (3100 molecular weight) 1 part by weight of the bicyclic amide acetal of Example 5 and 0.2 parts by weight of triethylene diamine was prepared and mixed in 1:1 weight ratio with liquid methylene bis(phenyl isocyanate) (2.1 NCO per molecule). An exothermic reaction occurred to give a viscous liquid which was applied on a Mylar film as 1-2 mils thick film. The resulting adhesive film was tested as an adhesive against a polyester foamed back cloth to form a laminate. An adhesive bond formed within 2 minutes which was strong enough to cause the foamed cloth substrates to tear in a pel test conducted in from 6-15 minutes on the laminate.

EXAMPLE 13

This example demonstrates that the adhesive compositions of this invention which show excellent adhesive performance towards flexible and semi-structural substrates also have excellent performance in adhering structural substrates such as sheet molding compound (SMC).

A curative component was prepared by the reaction of a mixture of 223 g of poly(propylene oxide) triol capped with ethylene oxide (molecular weight of about 3500) with 8 g of toluene diisocyanate, 151 g of 450 molecular weight polyether tetraol, 60 g of 2000 molecular weight poly(propylene oxide) diamine, 10 g of 3100 molecular weight poly(propylene oxide) triamine, 3 g of the bicyclic amide acetal of Example 5, 1 g of triethylene diamine and 115 g of talc. A 475 g portion of the resulting mixture was mixed with 3 g of fumed silica and 2 g of piperazine and was degassed under reduced pressure. The resulting curative component was then mixed in a 1:1 weight ratio with an isocyanate terminated prepolymer which was prepared by reaction of 100 parts by weight of 2000 molecular weight poly(propylene ether) glycol with 31 parts by weight of oligomeric methylene bis(phenyl isocyanate) (NCO functionality of 2.7 per molecule) and 45 parts by weight of liquid methylene bis(phenyl isocyanate) (NCO functionality of 2.1 per molecule) and 46 parts by weight of talc filler. The resulting mixed adhesive was found to be thixotropic and to have excellent non-sag character (did not flow when applied to vertical substate surfaces).

Adhesive bonds were prepared by using as substrates 12 inch×4 inch×100 mils SMC sheets and by applying this adhesive as ¼ inch thick beads on the surface of one substrate sheet, covering this surface with a second substrate sheet. The adhesive bond was maintained at 30 mils thickness by including some 30 mils diameter glass beads in the bond line. A 1 inch overlap was left between the substrate sheets to permit tests on the cured sheets. Thus, four test panels were assembled using in two cases no surface preparation SMC sheets and in other two cases methylene chloride wiped SMC sheets. Two systems one from no surface preparation and one from methylene chloride wiped surface were cured at room temperature without using any pressure and two systems were cured in the heated fixture at 200° F. for 4 minutes (1 psi pressure) followed by post-curing at 280° F. for 30 minutes. The room temperature kept samples were post cured after 2 hours during which time it was determined that the adhesive had built up strength enough to result in substrate delamination under lap shear testing with a strength of approximately 500 psi. The adhesive test samples were cut into 1 inch wide strips and tested in lap shear mode at room temperature. Some of the test samples were also tested after post-baking at 350° F. for 1 hour to determine the thermal stability of the adhesion. The test results are listed in the following Table.

TABLE

| | | LAP SHEAR STRENGTH (psi) | | | |
|---|---|---|---|---|---|
| | | RT Cure | | Heated Fixture Cure | |
| Sample # | Test Procedure | No Prep | MeCl$_2$ Wiped | No Prep | MeCl$_2$ Wiped |
| 1 | 280° F. Post Cure | 430 DL | 570 DL | 520 DL | 540 DL |
| 2 | 280° F. Post Cure | 440 DL | 490 DL | 510 DL | 520 DL |
| 3 | 280° F. Post Cure | 495 DL | 520 DL | 480 DL | 540 DL |
| 4 | 350° F. Post Cure | 430 DL | 330 DL | 310 SB | 380 DL |
| 5 | 350° F. Post Cure | 350 FT | 400 DL | 450 FT | 360 DL |

TABLE-continued

| | | LAP SHEAR STRENGTH (psi) | | | |
| | | RT Cure | | Heated Fixture Cure | |
| Sample # | Test Procedure | No Prep | MeCl$_2$ Wiped | No Prep | MeCl$_2$ Wiped |
| 6 | 350° F. Post Cure | 400 DL | 315 DL | 400 CF | 320 DL |

DL = substrate delaminated;
SB = substrate broke;
FT = surface fiber tear.
RT = room temperature

I claim:

1. A two component polyurethane adhesive comprising a first component comprising a polyisocyanate prepolymer and a second component comprising a polyol, a poly(alkylene oxide) polyamine containing two or more primary amine groups and having a molecular weight of from about 400 to about 10,000 and a polyurethane catalyst.

2. The adhesive of claim 1 wherein the polyurethane catalyst is selected from the group consisting of salts of tin, bismuth, zinc, lead, mercury, vanadium, cobalt, nickel, iron, potassium and copper and tertiary amines.

3. The adhesive of claim 2 wherein the polyol contains at least two hydroxyl groups and has a molecular weight in the range of from 20 to 5000.

4. The adhesive of claim 3 wherein the isocyanate prepolymer is prepared from methylene bis(phenyl isocyanate) and polyol (propylene oxide) diol.

5. The adhesive of claim 3 wherein the poly (alkylene oxide) polyamine is a mixture of poly(propylene oxide) diprimary amine and poly(propylene oxide) triprimary amine.

6. The adhesive of claim 3 wherein the polyurethane catalyst is triethylene diamine.

7. The adhesive of claim 3 wherein the polyurethane catalyst is dibutyl tin dilaurate.

8. The process comprising adhering a substrate material to another substrate comprising intercalating between the substrates the adhesive of claim 1 and curing the adhesive.

9. The process of claim 8 wherein the substrate material is selected from the group consisting of reinforced and unreinforced thermoplastic, reinforced and unreinforced thermosetting resins, metal and ceramics.

* * * * *